(12) United States Patent
Yoshimura

(10) Patent No.: US 6,645,079 B2
(45) Date of Patent: Nov. 11, 2003

(54) DAMPER MECHANISM

(75) Inventor: Yoshinari Yoshimura, Ikoma (JP)

(73) Assignee: Exedy Corporation, Osaka (JP)

( * ) Notice: Subject to any disclaimer, the term of this patent is extended or adjusted under 35 U.S.C. 154(b) by 19 days.

(21) Appl. No.: 10/153,786

(22) Filed: May 24, 2002

(65) Prior Publication Data

US 2002/0193165 A1 Dec. 19, 2002

(51) Int. Cl.⁷ ................................................ F16D 3/12
(52) U.S. Cl. .......................... 464/68; 192/205; 267/179
(58) Field of Search .......................... 192/205, 213.2, 192/213.21, 213.22; 464/61, 66, 67, 68; 267/179; 74/594

(56) References Cited

U.S. PATENT DOCUMENTS

| | | | |
|---|---|---|---|
| 1,321,512 A | 11/1919 | Eaton | 464/66 |
| 4,475,725 A | 10/1984 | Niemann | 267/179 |
| 4,838,395 A | 6/1989 | Chasseguet et al. | 188/378 |
| 4,856,638 A | 8/1989 | Roth et al. | 192/106.1 |
| 5,626,518 A | 5/1997 | Maki et al. | 464/64 |
| 5,908,100 A | 6/1999 | Szadkowski et al. | 192/214.1 |

FOREIGN PATENT DOCUMENTS

JP   2001-90781   4/2001

*Primary Examiner*—Lynne H. Browne
*Assistant Examiner*—Kenn Thompson
(74) *Attorney, Agent, or Firm*—Shinjyu Global IP Counselors, LLP

(57) ABSTRACT

A damper mechanism 4 is provided to prevent wear and damage to coil springs 21 and spring housing parts thereof. A clutch disk assembly 1 chiefly has an input rotary member 2, an output rotary member 3, and the damper mechanism 4. The damper mechanism 4 elastically couples the input rotary member 2 and the output rotary member 3 together in a rotational direction and includes the coil springs 21 and pairs of spring seats 51 that support end faces of the coils springs 21. Each spring seat 51 has a pair of engaging parts 57 having a pyramidal shape that extends in a direction opposite the coil spring 21, engages with seat bearing parts 86 and 96 formed in the input rotary member 2 such that it cannot rotate, and engages with the circumferentially facing end part of spring housing hole 71.

21 Claims, 9 Drawing Sheets

DAMPER MECHANISM

BACKGROUND OF THE INVENTION

1. Field of the Invention

The present invention relates to a damper mechanism. More specifically, the present invention relates to a damper mechanism that transmits torque and damps torsional vibrations.

2. Background Information

Conventional damper mechanisms used in vehicle clutch disk assemblies typically have a hub, an input rotary member, and coil springs. The hub is coupled to a shaft extending from a transmission. The input rotary member is coupled to a flywheel. The coil springs elastically couple the hub and the input rotary member together in a rotational direction. The input rotary member has a clutch disk and pair of input plates fixed to the inner portion of the clutch disk. The hub has a boss that is splined to the shaft, and a flange that extends radially from the boss. The coil springs are housed in a plurality of spring housing holes formed in the hub and are supported in spring housing parts formed in the pair of input plates. When the pair of input plates rotate relative to the hub, the coil springs are compressed in the rotational direction between the plates and the hub. Typically, a damper mechanism absorbs and damps rotational twisting vibrations inputted to the clutch disk assembly. This kind of damper mechanism also has spring seats for supporting the end faces of the coil springs. Through the spring seats, the coil springs are supported by the spring housing holes of the hub and the spring housing parts of the pair of input plates.

Regarding spring seats, there are some that have a seat part that supports the end face of the coil spring and a pair of engaging parts that are formed on the rear surface of the seat part. The pair of engaging parts axially sandwich a circumferentially facing end of the spring housing hole. The pair of engaging parts allow the spring seat to engage with the circumferentially facing end of the spring housing hole such that the spring seat cannot rotate about the axis of the coil spring. Further, the outside portions of the pair of engaging parts engage with the spring housing parts such that the seat cannot rotate.

In the conventional damper mechanism just described, the spring seats are fixed so that they cannot rotate about the coil spring axes with respect to the spring housing holes and spring housing parts. Consequently, when the pair of input plates rotates relative to the hub and the coil springs are compressed in the damper rotational direction between the plates and the hub, one end of each coil spring is supported only by an end face of the spring housing hole and the other end of each coil spring is supported only by the spring housing parts. As a result, the coil springs are pressed against the edges of the spring housing parts due to centrifugal force and sliding, easily allowing the coil spring and spring housing parts to become worn and damaged.

In view of the above, there exists a need for a damper mechanism that overcomes the above-mentioned problems in the prior art. This invention addresses this need in the prior art as well as other needs, which will become apparent to those skilled in the art from this disclosure.

SUMMARY OF THE INVENTION

An object of the present invention is to prevent wear and damage of the coil springs and spring housing parts in a damper mechanism.

In accordance with a first aspect of the present invention, a damper mechanism is arranged to transmit torque and damp torsional vibrations. The damper mechanism has a first rotary plate member, a pair of second rotary plate members, a coil spring, and a pair of spring seats. The first rotary plate member is formed with a spring housing hole. The pair of second rotary plate members is disposed so as to be fixed on opposite axially facing sides of the first rotary plate member. Each of the pair of second rotary plate members is formed with a spring housing part in a position that corresponds to the spring housing hole. The coil spring is arranged inside the spring housing hole and the spring housing parts, and can transmit torque between the first rotary plate member and the pair of second rotary plate members. Each of the pair of spring seats has a seat part that is disposed between an end of the coil spring and a circumferentially facing end of the spring housing hole/spring housing parts. Each spring seat supports the end face of the coil spring and a pair of engaging parts. The pair of engaging parts is aligned with the axial direction and extends from the opposite side of the seat part as the side that supports the coil spring. Further, the pair of engaging parts axially sandwiches the circumferentially facing end of the spring housing hole. Moreover, the engaging parts engage with the circumferentially facing end of each spring housing part such that they cannot rotate about the axis of the coil spring. The pair of engaging parts are of a pyramidal shape having its peak on the side opposite the side that supports the coil spring. Seat bearing parts corresponding to the pyramidal shape of the spring seats are formed in the circumferentially facing ends of the spring housing parts.

With this damper mechanism, when torque is delivered to the pair of second rotary plate members, torque is then transmitted to the first rotary plate member through the pair of spring seats and the coil spring. The torsional vibrations that occur during the torque transmission are absorbed and damped by compression of the coil spring in the rotational direction when the pair of second rotary plate members and the first rotary plate member rotate relative to each other. Here, the coil spring is compressed between the spring housing hole of the first rotary plate member and the spring housing parts of the second rotary plate members on the opposite side thereof.

The pair of engaging parts of the spring seat that contacts the spring housing hole sandwiches the circumferentially facing end of the spring housing hole of the first rotary plate member, and thus, cannot rotate about the axis of the coil spring relative to the spring housing hole. Since each of the pair of engaging parts of the spring seat that contacts the spring housing parts has a pyramidal shape, neither can rotate about the axis of the coil spring relative to the seat bearing parts on the circumferentially facing end of the spring housing parts of the second rotary plate members. Further, since the pair of engaging parts and the seat bearing parts have a pyramidal shape, the spring seats are prevented from rotating with respect to the spring housing parts, and therefore are restricted regarding movement in the radially outward direction caused by centrifugal force. As a result, it is difficult for the coil spring to slide on the edge sections of the spring housing parts. Thus, wear and damage of the coil spring and spring housing parts can be prevented. Additionally, the pair of engaging parts is formed to extend in the damper rotational direction. Consequently, the size of the spring seat can be reduced because the engaging parts do not occupy large amounts of space in the axial or radial directions of the damper.

A damping mechanism in accordance with a second aspect of the present invention is the mechanism of the first aspect wherein, each of the pair of engaging parts is provided with a first pyramid surface that is arranged on an axially inward side of the engaging part and faces axially toward a circumferentially facing end of the spring housing hole. Further, second and third pyramid surfaces are provided. The second and third pyramid surfaces are on an axially outward side of the engaging part and are aligned in a radial direction. The seat bearing parts of the damper mechanism of the second aspect have a pyramidal shape that matches the second and third pyramid surfaces of the engaging part.

With this damper mechanism, the spring seats can touch against and separate from the seat bearing part smoothly because the pair of engaging parts have a pyramidal shape having the second pyramid surface and third pyramid surface. Additionally, damage to the spring seats can be prevented because the contact area between the pair of engaging parts and the pair of seat bearing parts is large and the pressure on the contacting portions is small.

A damper mechanism in accordance with a third aspect of the present invention is the damper mechanism of the first or second aspect wherein, the coil spring is fixed such that it cannot rotate about the coil spring axis with respect to the spring seats. The spring seats support the end faces of the coil spring such that the coil spring cannot rotate about the its own axis. Further, the spring seat is supported such that it cannot rotate about the axis of the coil spring with respect to the spring housing parts.

As a result, when using a coil spring having end windings, the spring can be held in an orientation where the side of the coil spring closer to the center of the damper mechanism has one more winding than the side of the coil spring closer to the outside of the damper mechanism. Thus, the difference in per-winding deflection between the two sides of the coil spring and the difference in stress between the two sides of each winding that occur when the coil spring is compressed can both be reduced.

These and other objects, features, aspects, and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Embodiments of the present invention are described below based on the attached drawings.

(1) Structure of the Clutch Disk Assembly

Figure 1:
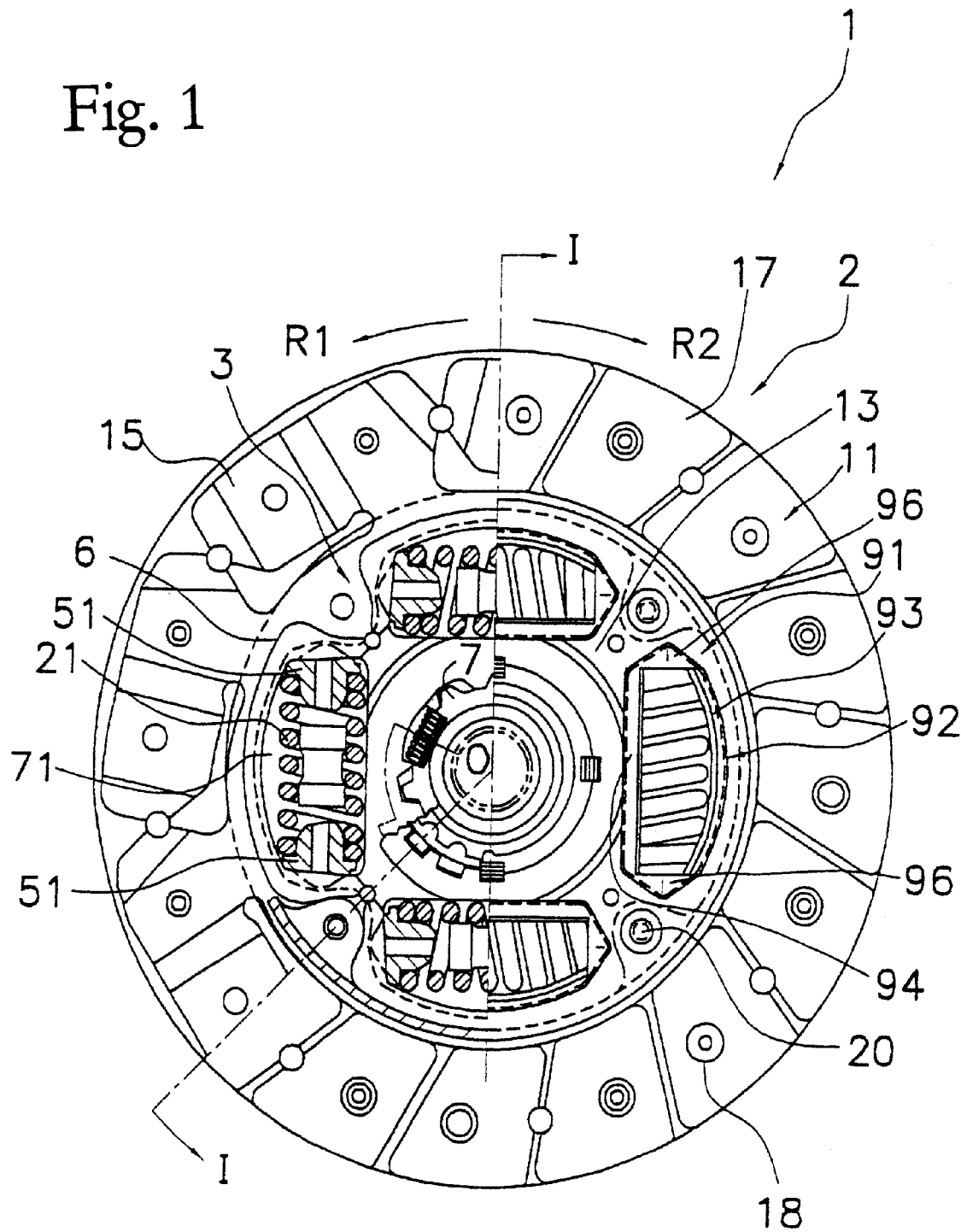
FIG. 1 is an elevational view of a clutch disk assembly that includes a portion that has been cross-sectioned for illustrative purposes in accordance with a preferred embodiment of the present invention.
Figure 2:
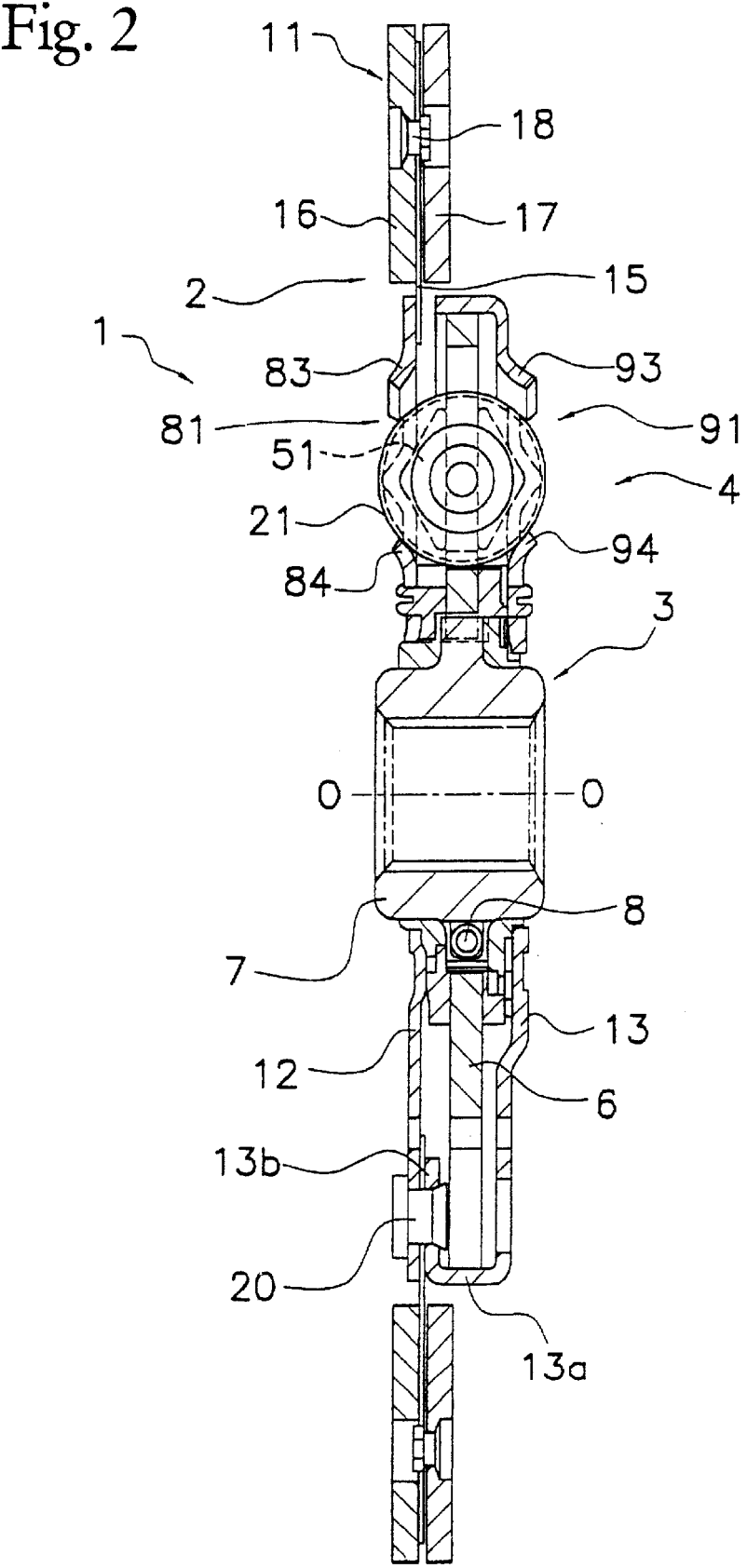
FIG. 2 is a cross-sectional view of the clutch disk assembly taken along an angle made of line segments I-O-I in FIG. 1.
Figure 3:
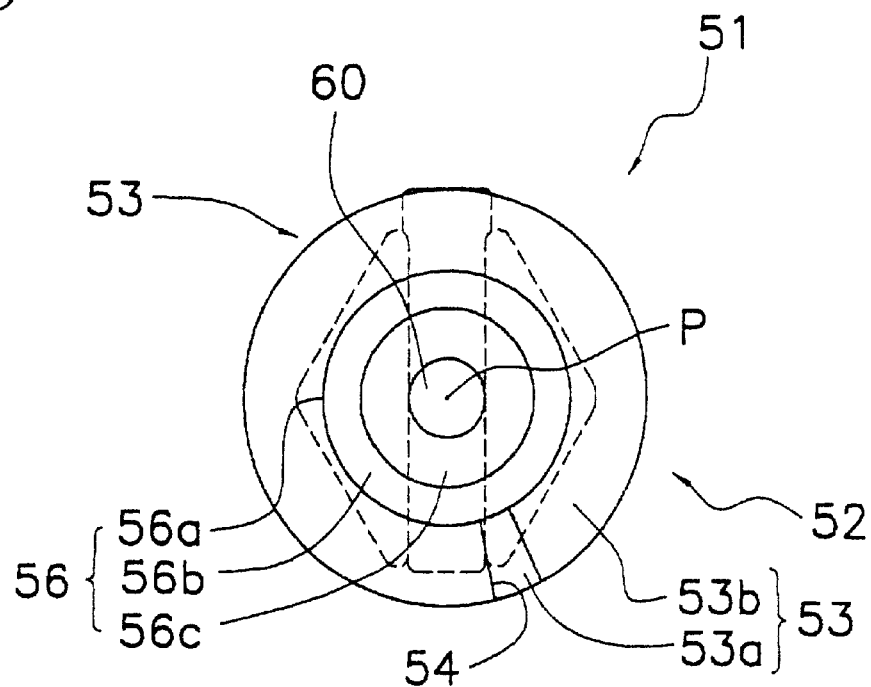
FIG. 3 is a front elevational view of a spring seat of the clutch disk assembly.

FIG. 1 is an elevational view of a clutch disk assembly 1 in accordance with a preferred embodiment of the present invention. FIG. 2 is a cross-sectional view taken along an angle made of line segments I-O-I of FIG. 1. In FIG. 1, arrow R1 indicates the rotational drive or positive direction of the clutch disk assembly 1 and arrow R2 indicates the opposite or negative direction. In FIG. 2, O—O indicates the rotational axis of the clutch disk assembly 1. An engine and flywheel (not shown) are disposed on the left side of the clutch disk assembly 1 as shown in FIG. 2 and a transmission (not shown) is disposed to the right side of the same as shown in FIG. 2. Referring to FIGS. 1 and 2, the clutch disk assembly 1 chiefly has an input rotary member 2 (pair of second rotary plate members), an output rotary member 3 (first rotary plate member), and a damper mechanism 4. The damper mechanism 4 is disposed between the input rotary member 2 and the output rotary member 3. The flywheel (not shown) inputs torque to the input rotary member 2. The input rotary member 2 chiefly has a clutch disk 11, a clutch plate 12, and a retaining plate 13. The clutch disk 11 presses against and couples with the flywheel (not shown). The clutch disk 11 primarily has a cushioning plate 15 and a pair of friction facings 16 and 17. The friction facings 16 and 17 are fixed to both axially facing sides of the cushioning plate 15 with rivets 18.

The clutch plate 12 and the retaining plate 13 are preferably both disk-shaped. More preferably, the clutch plate 12 and the retaining plate 13 are ring-shaped members having a center hole and are disposed at a prescribed distance from each other in the axial direction. The clutch plate 12 is disposed on the engine side and the retaining plate 13 is disposed on the transmission side. A cylindrical part 13a is formed on the outer circumferential section of the retaining plate 13 and extends toward the clutch plate 12. A plurality of fixing parts 13b extends radially inward from the tip edge of the cylindrical part 13a. The fixing parts 13b are disposed on the transmission-facing surface of the clutch plate 12 and are fixed thereto by a plurality of rivets 20. Consequently, the clutch plate 12 and the retaining plate 13 rotate integrally as a single unit. Furthermore, the rivets 20 also fix the inner circumferential section of the cushioning plate 15 to the engine-facing side of the fixing parts 13b.

Figure 12:
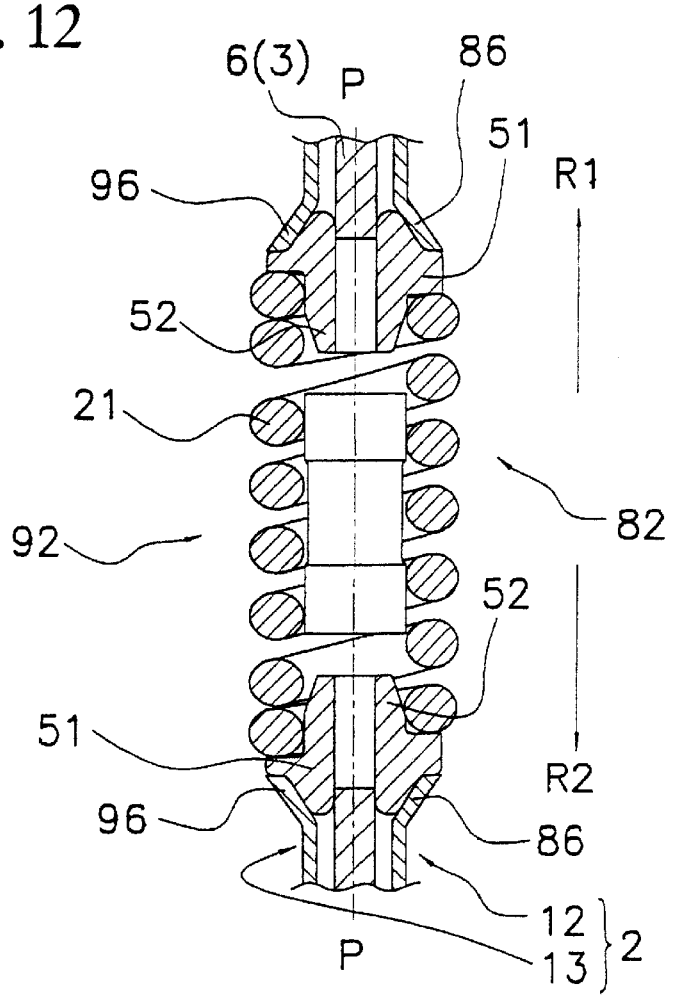
FIG. 12 is a cross sectional view of the damper mechanism taken along line III—III of FIG. 11.

Window parts 81 and 91 are formed in the clutch plate 12 and the retaining plate 13, respectively. The window parts 81 and 91 are aligned in the circumferential direction. In this embodiment, there are preferably four window parts 81 and four window parts 91, each equally spaced in the circumferential direction. Each of the window parts 91 of the retaining plate 13 has a hole opened in the axial direction and a spring housing part 92 formed along the edge of the hole. Similarly, as seen in FIG. 12, a spring housing part 82 is formed in each window part 81 of the clutch plate 12.

Referring again to FIGS. 1 and 2, output rotary member 3 serves to transmit the torque delivered from the input rotary member 2 to the transmission (not shown). The output rotary member 3 has a hub 7, a hub flange 6, and a low-rigidity damper 8. The hub 7 is a cylindrical member and is disposed inside the center holes of the clutch plate 12 and the retaining plate 13. The hub 7 is splined to an transmission input shaft (not shown) that is inserted through the center holes. The hub flange 6 is a ring-shaped member that is arranged around the outside of the hub 7 and is disposed axially between the clutch plate 12 and the retaining plate 13. The low-rigidity damper 8 preferably has a small coil spring that is disposed radially between the hub 7 and the hub flange 6. The low-rigidity damper 8 serves to couple elastically the hub 7 and the hub flange 6 together. The outer circumferential surface of the hub flange 6 extends to the radially inward facing side of the cylindrical part 13a of the retaining plate 13. Spring housing holes 71 for housing coil springs 21 (discussed later) are formed in the hub flange 6. In this embodiment, there are preferably four spring housing holes 71 corresponding to the window parts 81 and 91, the details of which are discussed later. The damper mechanism 4 serves to couple elastically the input rotary member 2 and the output rotary member 3 together in the rotational direction. The damper mechanism chiefly has a plurality of the aforementioned coil springs 21 and pairs of spring seats 51 that support the end faces of each the coil springs 21. The coil springs 21 and spring seats 51 are arranged inside the window parts 81 and 91, or more specifically, the spring housing parts 82 and 92 thereof, and the spring housing holes 71. The spring housing parts 92 formed in the retaining plate 13 have the function of housing the coils springs 21 (discussed later). The spring housing parts 92 have an outer bearing part 93, an inner bearing part 94, and a pair of seat bearing parts 96.

The outer bearing part 93 is a portion that is cut and bent axially outward. The outer bearing part 93 is preferably shaped like an arc that is concentric with the retaining plate 13. The inner bearing part 94 is a portion that is cut and bent axially outward in a linear shape. Further, the inner bearing part 94 is positioned toward the center of the plate 13 with respect to the outer bearing part 93. The two seat bearing parts 96 are raised parts that are disposed radially between the outer bearing part 93 and the inner bearing part 94. The seat bearing parts 96 are formed so as to connect the ends of bearing parts 93 and 94, and engage with the pair of spring seats 51.

The spring housing parts 82 of the clutch plate 12 preferably have the same or similar shape and constituent features as the spring housing parts 92. As seen in FIGS. 1, 2, and 12, the spring housing parts 82 has an outer bearing part 83, an inner bearing part 84, and a pair of seat bearing parts 86.

Referring again to FIGS. 1 and 2, the spring housing hole 71 has an outer part, an inner part, and two circumferentially facing parts. The outer part preferably has the shape of an arc that is concentric with respect to the clutch plate 12 or hub flange 6. The inner part is linearly shaped and positioned toward the center of the hub flange 6 with respect to the outer part. The two circumferentially facing end parts are disposed radially between the outer part and inner part and are formed so as to connect the ends of said outer and inner parts.

Viewed elevationally perpendicularly to a center axis, the cross-sectional shape of coil springs 21 is preferably elliptical or egg-shaped. In this embodiment, the coil springs 21 preferably have an end winding at each end. The end face of each end winding is preferably not ground and has the original cross sectional shape of the spring material. The side of each coil spring 21 that is closer to the center of the clutch disk assembly is supported by the inner bearing parts 84 and 94 of the spring housing parts 82 and 92 such that the coil spring 21 will not pop out of place in the axial direction. The side of each coil spring 21 that is farther from the center of the clutch disk assembly 1 is supported by the outer bearing parts 83 and 93 of spring housing parts 82 and 92 such that the coil spring 21 is prevented from being displaced in the axial direction.

Figure 7:
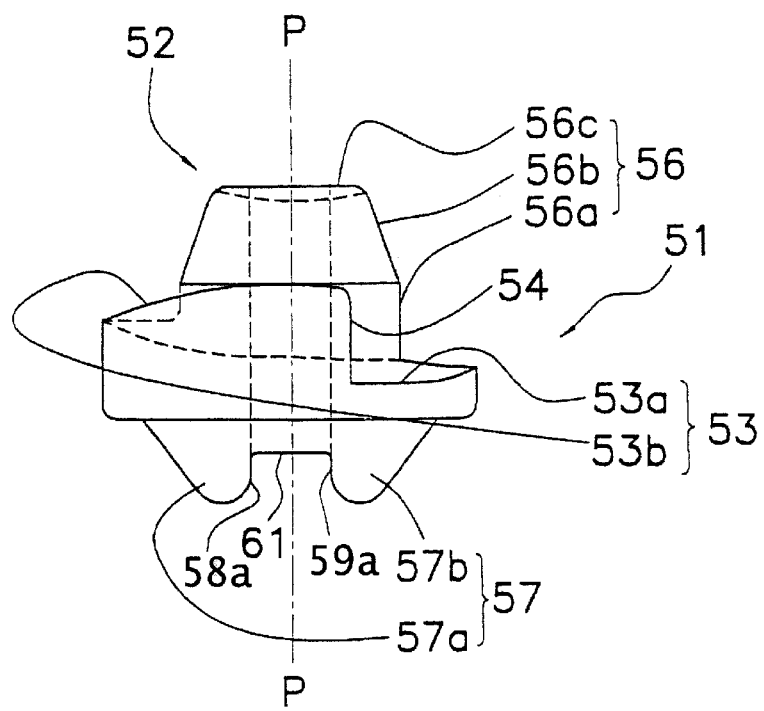
FIG. 7 is a bottom plan view of the spring seat.
Figure 8:
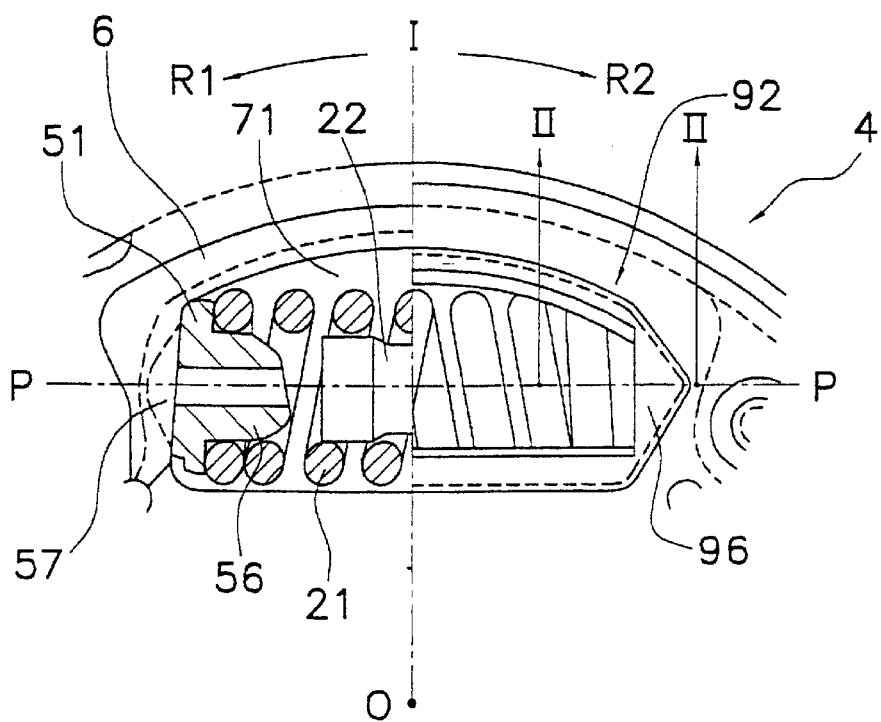
FIG. 8 is a partial enlarged view of FIG. 1 showing a damper mechanism of the clutch disk assembly.

Next, the pairs of spring seats 51 are discussed with primarily reference to FIGS. 1 to 8. Here, each of the two spring seats 51 are arranged facing as seen in FIG. 1, each other such that they sandwich a coil spring 21 therebetween in the damper rotational direction. The symbol P shown in FIGS. 3 and 4 indicates the coil center axis of the spring coil 21, which extends vertically toward the front and back of the plane of the paper in the figures. In the following paragraphs, as seen in FIG. 8, the coil axis corresponds to axis P—P.

Referring to FIGS. 2 and 8, the pair of spring seats 51 support the end of the coil spring 21 such that the coil spring 21 cannot rotate about the coil axis. The spring seats 51 are supported such that they cannot rotate with respect to the spring housing hole 71 and the spring housing parts 82 and 92. The pair of spring seats 51 is preferably made of a hard resin or elastic resin material.

Below the shape of the spring seats 51 is discussed.

Figure 5:
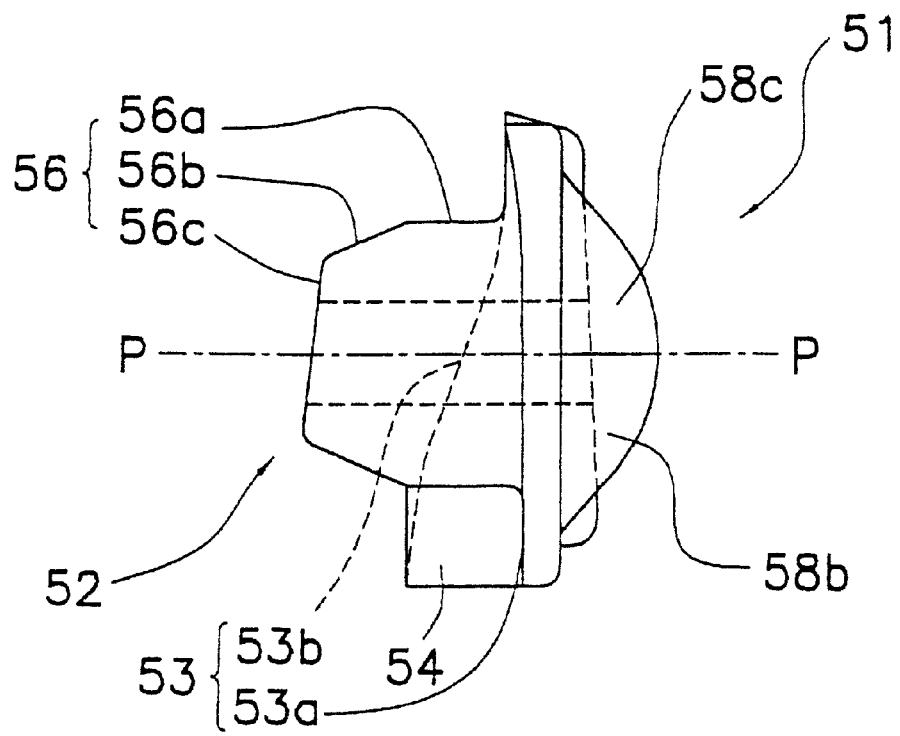
FIG. 5 is a lateral elevational view of the spring seat.
Figure 6:
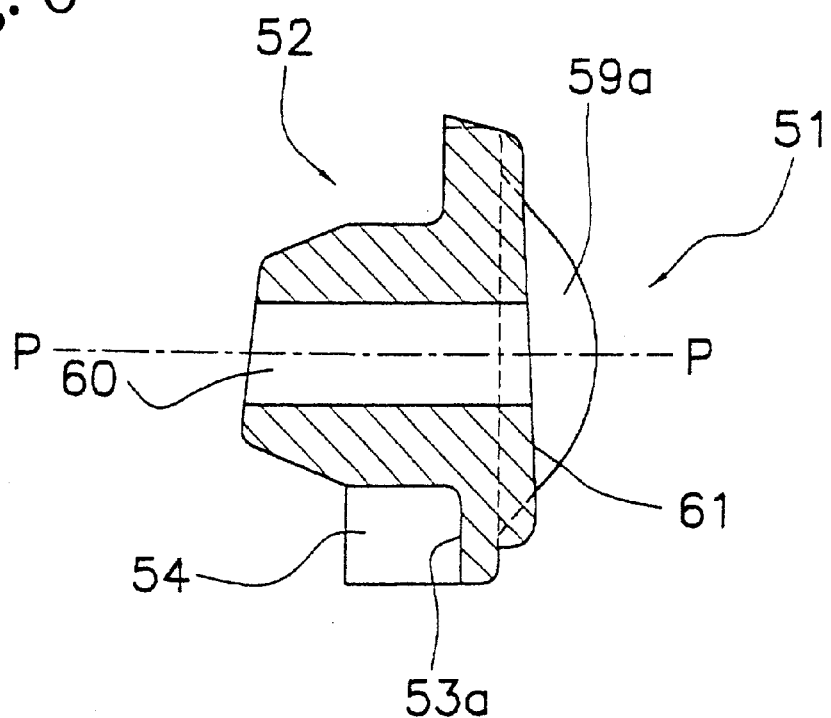
FIG. 6 is a lateral cross-sectional view of the spring seat.

Referring to FIGS. 5 and 7, each spring seat 51 chiefly has a seat part 52 and a pair of engaging parts 57. The engaging parts 57 are formed on the rear surface of the seat part 52. As seen in FIG. 8, the engaging parts 57 extend in the opposite direction as the coil spring 21 along the direction of axis P—P. Referring again to FIGS. 5 and 7, the seat part 52 serves to support the end part of the coil spring 21 such that it cannot rotate about axis P—P. The seat part 52 has a seat surface 53, an end winding abutment part 54, and a cylindrical protrusion 56. The seat surface 53 bears a surface of the end winding of the coil spring 21. The winding abutment part 54 abuts against a tip end of the end winding of the coil spring 21. The winding abutment 54 preferably abuts the tip end of the end winding of the coil spring 21 in a direction that is substantially parallel to axis P—P. The cylindrical protrusion 56 extends into a coil or coils from the end part of the coil spring 21. When viewed in an elevational direction parallel to axis P—P, the end winding abutment part 54 is preferably a rectangular surface formed so as to face opposite the tip end of the end winding of the coil spring 21.

The seat surface 53 has a rectangular first seat surface 53a and a helical second seat surface 53b. The rectangular first seat surface 53a extends from the side of the end winding abutment part 54 that is closer to the rear surface of the spring seat in a direction perpendicular to axis P—P of the coil spring 21. The helical second seat surface 53b extends from the first seat surface 53a along a helix corresponding to one revolution of the end winding of the coil spring 21. The end face of the second seat surface 53b is connected to the side of the end winding abutment part 54 that is closer to the coil spring 21. The second seat surface 53b is a circular ring-shaped surface in an elevational view taken in the direction of axis P—P and the outer diameter of the circular ring-shaped surface is preferably slightly smaller than the outer diameter of the coil spring 21.

The protrusion 56 has a cylindrical surface 56a, a protrusion conical surface 56b, and a tip surface 56c. The cylindrical surface 56a exists on a radial inside of the seat surface 53 and extends in a direction parallel to axis P—P. The cylindrical surface 56a has a cylindrical shape that is preferably slightly smaller in diameter than the internal diameter of the coil spring 21, and has a cylindrical height corresponding to the height of one revolution of the end winding of the coil spring 21. The protrusion conical surface 56b is a conical surface formed on the tip of the cylindrical surface 56a. The protrusion conical surface 56b tapers along the direction of axis P—P and does not reach its apex. The tip surface 56c is a planar surface formed on the tip of the protrusion conical surface 56b. The tip surface 56c extends in the radial direction of the damper mechanism 4 and has an elliptical outline. A through hole 60 passes through the spring seat 51 from the center of the tip surface 56c in the direction of axis P—P.

The entire surface of the end winding at the end of the coil spring 21 preferably touches against the seat surface 53 of the seat part 52 and the tip of the end winding abuts against the end winding abutment part 54. Therefore, the coil spring 21 is fixed such that it cannot rotate about axis P—P relative to the pair of spring seats 51. In other words, since the end winding abutment surfaces 54 of the pair of spring seats 51 face in opposite directions with respect to the coil winding direction of the coil spring 21, the coil spring 21 cannot rotate in either direction about axis P—P.

Figure 9:
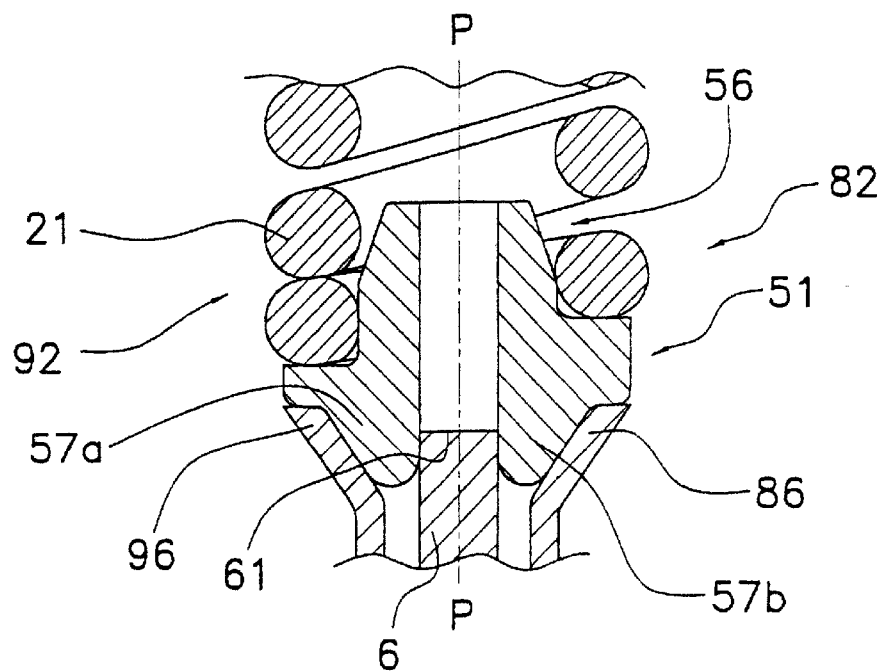
FIG. 9 is a cross-sectional view of the damper mechanism taken along line II—II in FIG. 8.

Referring to FIGS. 5, 7, and 9, the pair of engaging parts 57 engages with seat bearing parts 86 and 96 such that the pair cannot rotate, and also engages with the circumferentially facing end of the spring housing hole 71. The pair of engaging parts 57 preferably has a quadrangular pyramid shaped portion that extends from the rear surface of the seat part 52 toward the outside of spring housing parts 82 and 92 in a circumferential direction. The pair of engaging parts 57 have a hub abutment surface 61 that is formed on the rear surface of the seat part 52 and abuts against the inside surface of the circumferentially facing end part of spring housing hole 71 and engaging parts 57a and 57b that are formed on the retaining plate 13 side and the clutch plate 12 side, respectively, and extend outward from the hub abutment surface 61 in a circumferential direction.

Figure 4:
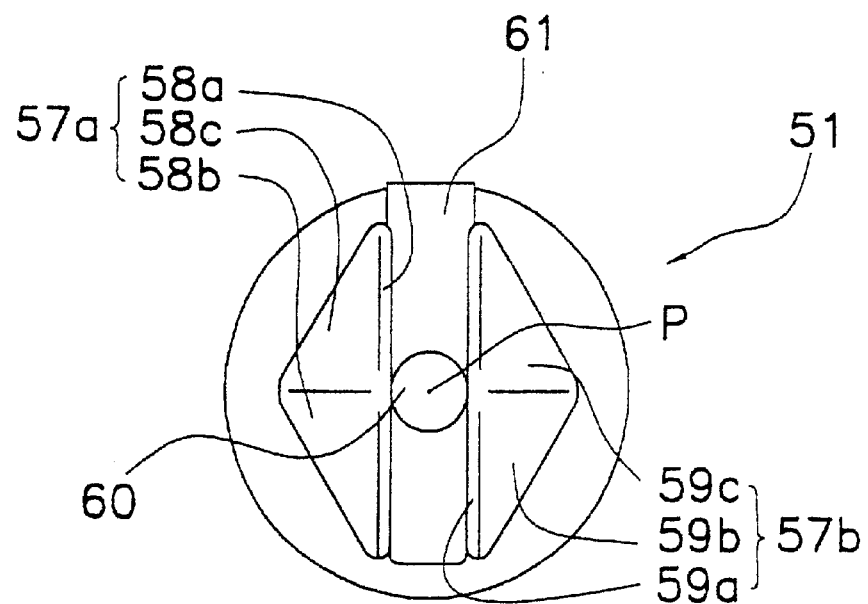
FIG. 4 is a rear elevational view of the spring seat.

The engaging part 57a is formed on the retaining plate 13 side and has a triangular pyramidal shaped portion having a first pyramid surface 58a, a second pyramid surface 58b, and a third pyramid surface 58c. Referring to FIG. 4, the first pyramid surface 58a preferably has an isosceles triangle-shaped surface. The first pyramid surface 58a is formed to extend outward from the rear surface of the seat part 52 in a circumferential direction. The second pyramid surface 58b and the third pyramid surface 58c are two pyramid surfaces that, together with first pyramid surface 58a, make up a triangular pyramid. The triangular pyramid has the two slanted ridge lines that define the first pyramid surface 58a and the one slanted ridge line that runs from the apex of the first pyramid surface 58a and extends diagonally toward the rear surface of the seat part 52. Of these two pyramid surfaces, the second pyramid surface 58b is the one closer to the center of the damper and the third pyramid surface 58c is the one farther from the center of the damper.

As seen in FIG. 4, the engaging part 57b on the clutch plate 12 side has a first pyramid surface 59a that has the same shape as the first pyramid surface 58a on the retaining plate 13 side and lies in a plane perpendicular to the rotational axis of the clutch disk assembly 1. The two first pyramid surfaces are spaced apart in the axial direction. The engaging part 57b also has a second pyramid surface 59b and a third pyramid surface 59c that, together with the first pyramid surface 59a, form a triangular pyramidal shape that axially faces opposed to the engaging part 57a.

Figure 10:
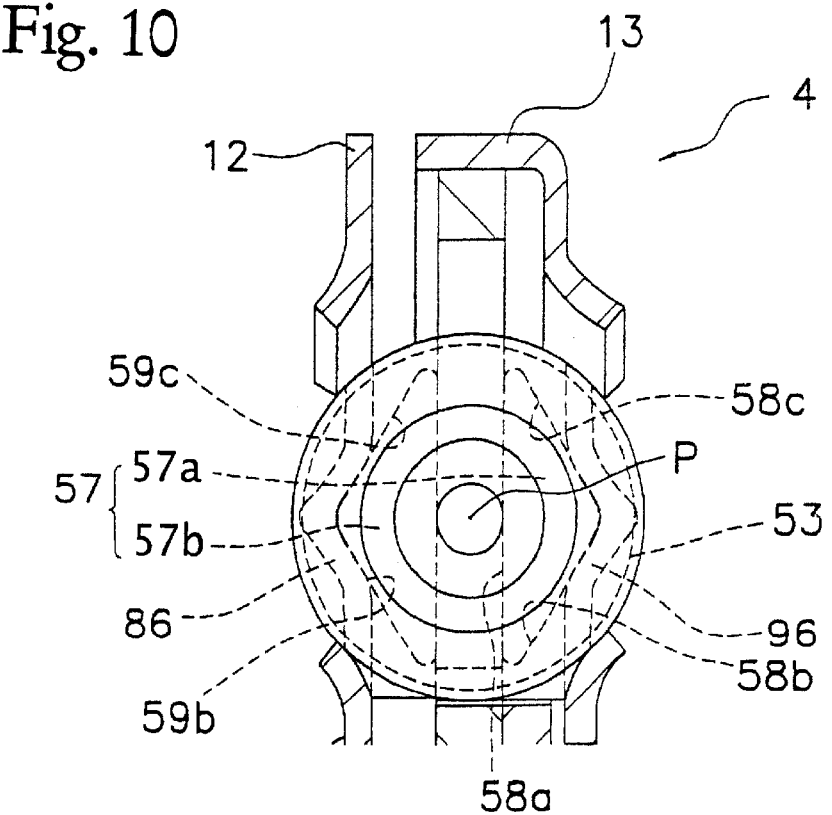
FIG. 10 is a partial enlarged view of FIG. 2 showing the damper mechanism.

Next, the assembled condition of the spring seats 51 in the seat bearing parts 86 and 96 is discussed primarily with reference to FIGS. 8 to 10. FIG. 8 is an enlarged elevational view of the damper mechanism 4 portion of FIG. 1. FIG. 9 is a cross-sectional view taken along line II—II of FIG. 8. FIG. 10 is an enlarged cross sectional view of the damper mechanism 4 portion of FIG. 2.

Referring to FIG. 9, the hub abutment surface 61 of the spring seat 51 abuts against the surface of the circumferentially facing end part of the spring housing hole 71 of the hub flange 6 that is closer to the center of the clutch disk assembly 1. Consequently, the pair of engaging parts 57a and 57b of the spring seat 51 sandwich the circumferentially facing end part of the spring housing hole 71. Referring to FIG. 9, more the specifically, the first pyramid surface 58a of the engaging part 57a and the first pyramid surface 59a of the engaging part 57b are both in close proximity to the axially facing sides of the circumferentially facing end part of the spring housing hole 71. Thus, the spring seat 51 can separate from the circumferentially facing end part of spring housing hole 71 in the damper rotational direction but, when engaged, can neither move in the damper axial direction with respect to the hub flange 6 nor rotate about axis P—P.

The pair of engaging parts 57 of the spring seat 51 touch against and are supported by the seat bearing parts 86 and 96 of the plates 12 and 13, respectively. More specifically, as seen in FIGS. 9 and 10, the seat bearing part 96 has a triangular pyramidal shaped surface that is raised toward the axially outside facing of the retaining plate 13 and engages with the pyramid surfaces 58b and 58c. Similarly, the seat bearing part 86 has a triangular pyramidal shaped surface that is raised toward the axially facing outside of the clutch plate 12 and engages with the pyramid surfaces 59b and 59c. Thus, the pair of spring seats 51 can separate from the seat bearing parts 86 and 96 in the damper rotational direction but, when engaged, can neither move in the damper axial direction or rotational direction with respect to the plates 12 and 13 nor rotate about axis P—P. Furthermore, the pair of spring seats 51 are supported such that they cannot rotate about axis P—P with respect to the spring housing hole 71. Hence, the coil spring 21 is supported such that it cannot rotate about axis P—P with respect to the spring housing hole 71.

Figure 14:
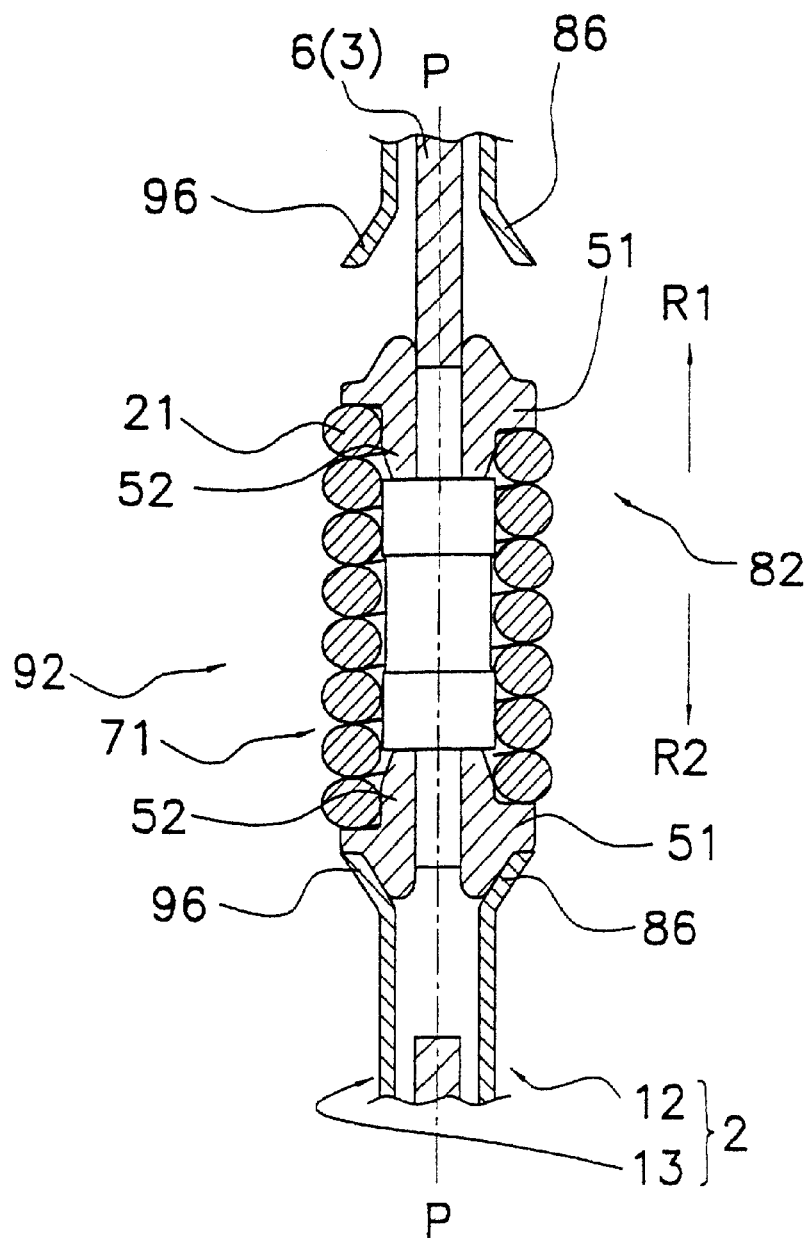
FIG. 14 is a cross sectional view of the damper mechanism taken along line III—III of FIG. 13.

In the clutch disk assembly 1 described here, the pair of spring seats 51 is prevented from rotating by the hub flange 6. The pair of spring seats 51 is also prevented from rotating by the plates 12 and 13. As seen in FIG. 14, when relative rotation occurs between the hub flange 6 and the plates 12 and 13, the spring seats 51 contact either the hub flange 6 or the plates 12 and 13. As seen in FIG. 12, when relative rotation does not occur between the hub flange 6 and the plates 12 and 13, the spring seats 51 contact the hub flange 6 and the plates 12 and 13. Thus, the spring seats 51 are prevented from rotating relative to the hub flange 6 and the plates 12 and 13. The coil spring 21 is prevented from rotating by the pair of spring seats 51. In short, the coil spring 21 cannot rotate on axis P—P with respect to any of the component members. In the present embodiment, this rotation prevention function is utilized to arrange the coil spring 21 inside the spring housing part 92 such that the number of windings excluding the end winding is preferably four on the side farther from the center of the clutch disk assembly and five on the side closer to the center of the clutch disk assembly 1. Thus, the coil spring 21 is preferably arranged such that it has one more winding on the side closer to the center of the clutch assembly than on the side farther from the center of the clutch disk assembly.

Referring to FIG. 8, a rubber rod 22 is preferably disposed inside the coil spring 21. The rubber rod 22 is pinched between the protrusions 56 of the pair of spring seats 51 when the coil spring 21 is compressed and serves to generate a stop torque.

(2) Operation of the Clutch Disk Assembly

Figure 11:
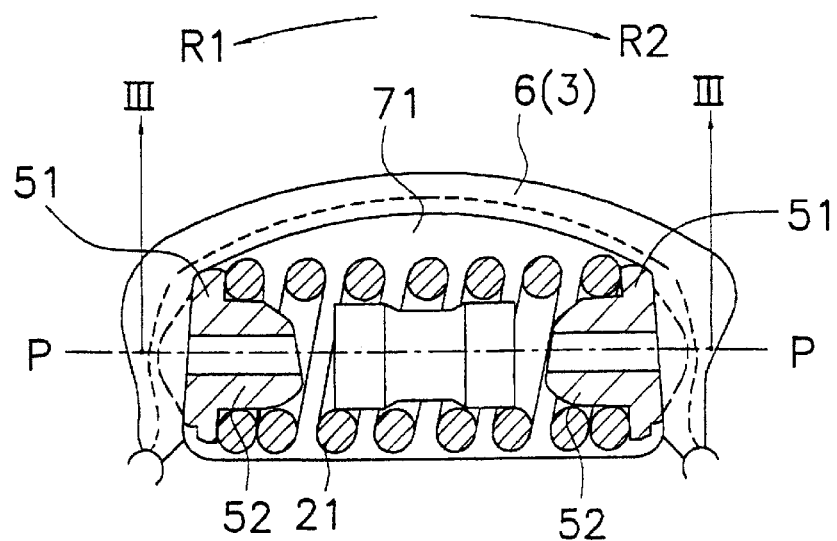
FIG. 11 is a partial enlarged view of FIG. 1 illustrating the operation of the damper mechanism.
Figure 13:
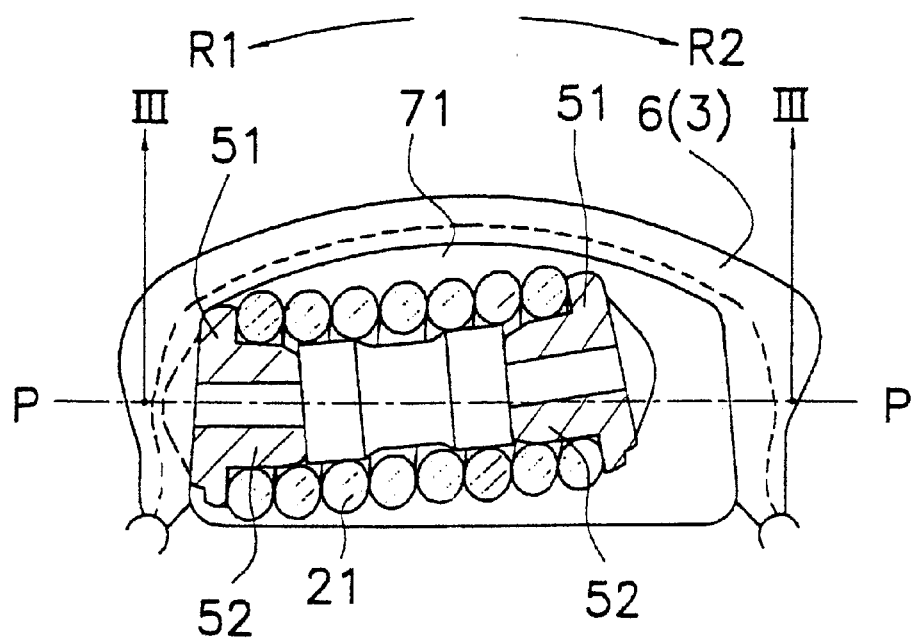
FIG. 13 is a partial enlarged view of FIG. 1 illustrating the operation of the damper mechanism.

Below, the operation of the clutch disk assembly 1 is described with reference primarily to FIGS. 11 to 14. FIG. 11 is a cross-sectional view of the damper mechanism 4 when the clutch is not engaged. FIG. 12 is a cross-sectional view of the damper mechanism 4 as viewed from the III—III direction indicated in FIG. 11. FIG. 13 is a cross-sectional view of the damper mechanism 4 when the clutch is engaged and twisting has occurred. FIG. 14 is a cross-sectional view of the damper mechanism 4 as viewed from the III—III direction indicated in FIG. 13.

Referring to FIG. 14, when the clutch plate 12 and the retaining plate 13 are twisted in the R1 direction with respect to the hub flange 6, the coil spring 21 is pressed by the seat bearing parts 86 and 96 through the spring seat 51 on the R2 side and compressed in the R1 direction within the spring housing hole 71 of the hub flange 6. When this occurs, the R1 side end part of the coil spring 21 is supported on the seat part 52 of the R1 side the spring seat 51 such that it cannot rotate about axis P—P. Further, the pair of engaging parts 57 of the R1 side spring seat 51 are supported by the R1 side end face of the spring housing hole 71 of the hub flange 6 such that they cannot rotate about axis P—P. Meanwhile, the R2 side end part of the coil spring 21 is supported by the seat bearing parts 86 and 96 through the pair of engaging parts 57 of the R2-side spring seat 51 such that it cannot rotate about axis P—P and cannot move in a radially outward direction.

(3) Operational Effects of the Spring Seats

The spring seats of the present invention have the following basic effects.

Since the pair of engaging parts 57 axially sandwich the circumferentially facing end of the spring housing hole 71, the engaging parts 57 of the spring seat 51 cannot move in the an axial direction with respect to the hub flange 6, or a damper relational direction when engaged with the hub flange 6. Further, the spring seats 59 cannot rotate about axis P—P. Meanwhile, since the engaging parts 57 engage with the bearing parts 86 and 96 of the plates 12 and 13, respectively, the pair of engaging parts 57 of the spring seat 51 cannot move with respect to the plates 12 and 13 in the damper axial direction, damper rotational direction, or damper radial direction and furthermore cannot rotate about axis P—P when engaged therewith.

The coil spring 21 can be held in the appropriate orientation because the coil spring 21 is restricted from rotating about axis P—P by the two rotary members 2 and 3 through the pair of spring seats 51: The "appropriate orientation" mentioned here is a state in which the coil spring 21 has fewer windings on the side farther from the center of the clutch disk assembly than on the side closer to the center of the clutch disk assembly and the difference in the stress generated in the windings on the closer side versus the farther side is small. As a result, the life of the coil spring 21 is improved.

The spring springs seats of the present invention also have the following special effects.

Since both ends of the coil spring 21 are restricted from moving in the damper radial direction with respect to the two rotary members 2 and 3 by the pair of spring seats 51, the end parts of the coil spring 21 are restricted from moving in the radially outward direction. Consequently, it is difficult for the coil spring 21 to slide on the edge sections of the spring housing hole 71 and the spring housing parts 82 and 92 even if centrifugal force acts on the coil spring 21 when it is compressed. As a result, the coil spring 21 and other components do not easily become worn or damaged.

The pair of engaging parts 57 of each spring seat 51 has two functions, to engage with the spring housing hole 71 of the hub flange 6, and to engage with the spring housing parts 82 and 92 of the plates 12 and 13. More particularly, the pair of engaging parts 57 and the pair of seat bearing parts 86 and 96 have a simple pyramidal shape. Since the pair of engaging parts 57 extend from the seat part 52 in the damper rotational direction, the seat part 52 does not occupy a large amount of space in the axial and radial directions of the damper. Consequently, in this embodiment, as shown in FIG. 10, the outer diameter of the seat surface 53 of the seat part 52 can be smaller than the outer diameter of the coil spring 21. Thus, the pair of spring seats 51 is given a more compact and space-saving structure. The present invention is particularly advantageous in that it has reduced the size of the pair of spring seats 51 that prevent the coil spring 21 from rotating about its own axis. The contact area between the pair of engaging parts 57 and the pair of seat bearing parts 86 and 96 is large and the pressure on the contacting portions is small. Consequently, the spring seats 51 are prevented from being damaged. Furthermore, since the pair of engaging parts 57 forms a pyramidal shape having its apex facing outward in a circumferential direction, the pair of spring seats 51 can smoothly touch against and separate from the pair of seat bearing parts 86 and 96.

The specific constituent features of the present invention are not limited to those of the embodiment just described based on the drawings. Instead, the features can be changed so long as they do not deviate from the gist of the invention. For example, the damper mechanism of the present invention can also be applied to a clutch disk assembly in which the hub and hub flange are integrated into a single member. Furthermore, the invention is not limited to a clutch disk assembly and can be applied to flywheel assemblies and lockup clutches for torque converters.

Effects of the Invention

In the damper mechanism of the present invention, the pair of engaging parts of the spring seats and the seat bearing parts have a pyramidal shape and restrict movement with respect to the spring housing parts in the radially outward direction caused by centrifugal force. Consequently it is difficult for the coil spring to slide on the edge section of the spring housing parts and wear and damage of the coil spring and spring housing parts can be prevented.

The terms of degree such as "substantially," "about," and "approximately" as used herein mean a reasonable amount of deviation of the modified term such that the end result is not significantly changed. These terms should be construed as including a deviation of at least ±5% of the modified term if this deviation would not negate the meaning of the word it modifies.

This application claims priority to Japanese Patent Application No. 2001-178500. The entire disclosure of Japanese Patent Application No. 2001-178500 is hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing description of the embodiments according to the present invention are provided for illustration only, and not for the purpose of limiting the invention as defined by the appended claims and their equivalents.

What is claimed is:

1. A damper mechanism for transmitting torque and damping torsional vibrations comprising:
    a first rotary plate member having a spring housing hole;
    a pair of second rotary plate members being disposed to be fixed-on opposite axially facing sides of said first rotary plate member, each of said pair of second rotary plate members being formed with a spring housing part in a position corresponding to said spring housing hole, said pair of second rotary plate members having a pair of seat bearing parts being formed in circumferentially facing ends of said spring housing parts, said pair of seat bearing parts having a pyramidal shape;
    a coil spring being arranged inside said spring housing hole and said spring housing parts, said coil spring being configured to transmit torque between said first rotary plate member and said pair of second rotary plate members; and
    a pair of spring seats, each of said pair of spring seats having,
        a seat part being disposed between an end of said coil spring and a circumferentially facing end of said spring housing hole, said seat part being disposed between an end of said coil spring and a circumferentially facing end of said spring housing parts, said seat part having a first side being configured to support an end face of said coil spring and a second side being located opposite said first side of said seat part in a circumferential direction, and
        a pair of engaging parts being aligned in an axial direction, said pair of engaging parts being configured to extend from said second side of said seat part, said pair of engaging parts being configured to sandwich axially said circumferentially facing end of said spring housing hole, said pair of engaging parts being configured to engage with said circumferentially facing end of each of said spring housing parts, said pair of engaging parts being non-rotatable about an axis of said coil spring, said engaging parts having a pyramidal shape having a peak on said second side of said seat part, said pyramidal shape of said engaging parts corresponding to said pyramidal shape of said pair of seat bearing parts.

2. The damping mechanism according to claim 1, wherein each of said pair of engaging parts has
    a first pyramid surface that is on an axially inward side of the engaging part, and said first pyramid surface faces axially toward a circumferentially facing end of said spring housing hole, and
    second and third pyramid surfaces that are on an axially outward side of said engaging part, said second and third pyramid surfaces are aligned in a radial direction, and
    each of said seat bearing parts has a pyramidal shape that matches said second and third pyramid surfaces of said engaging part.

3. The damper mechanism according to claim 2, wherein said coil spring is arranged to be non-rotatable about its own axis with respect to said spring seat.

4. The damper mechanism according to claim 1, wherein said coil spring is arranged to be non-rotatable about its own axis with respect to said spring seat.

5. A clutch disk assembly being configured to transmit torque from an engine to a transmission comprising:
    an input rotary member having a housing part and seat bearing parts having a pyramidal shape;
    an output rotary member having a housing hole; and
    a damper mechanism being configured to connect elastically said input rotary member and said output rotary member, said damper mechanism comprising,
        an elastic member, and
        spring seats being arranged at circumferentially opposite ends of said elastic member, each of said spring seats comprising,
            a seat part being disposed between said elastic member and said housing hole, said seat part being disposed between an end of said elastic member and said housing part, said seat part having a first side being configured to support an end face of said elastic member and a second side being located opposite said first side of said seat part in a circumferential direction, and
            a pair of engaging parts being aligned in an axial direction, said pair of engaging parts being configured to extend from said second side of said seat part in said circumferential direction, said pair of engaging parts being configured to sandwich axially a circumferentially facing end of said housing hole, said pair of engaging parts being configured to engage a circumferentially facing end of said housing parts, said pair of engaging parts being non-rotatable about an axis of said elastic member extending in a rotation direction of said clutch disk assembly, said engaging parts having a pyramidal shape having a peak on said second side of said seat part, said pyramidal shape of said engaging parts corresponding to said pyramidal shape of said pair of seat bearing parts.

6. The clutch disk assembly according to claim 5, wherein each of said pair of engaging parts has
    a first pyramid surface that is on an axially inward side of the engaging part, and said first pyramid surface faces axially toward a circumferentially facing end of said housing hole, and
    second and third pyramid surfaces that are on an axially outward side of said engaging part, said second and third pyramid surfaces are aligned in a radial direction, and
    each of said seat bearing parts has a pyramidal shape that matches said second and third pyramid surfaces of said engaging part.

7. The clutch disk assembly according to claim 6, wherein said elastic member comprises at least one coil spring.

8. The clutch disk assembly according to claim 7, wherein said coil spring is arranged to be non-rotatable about its own axis with respect to said spring seat.

9. The clutch disk assembly according to claim 8, wherein said seat part has an end winding abutment part that extends substantially parallel to said axis of said elastic member, said end winding abutment part is configured to abut a tip end of an end winding of said coil spring.

10. The clutch disk assembly according to claim 9, wherein each of said spring seats further comprises a through hole formed therein to extend in a direction that is substantially parallel to said axis of said elastic member.

11. The clutch disk assembly according to claim 10, wherein a first base of said second pyramid surface extends outward in axial and radial directions, a second base of said third pyramid surface extends outward in a radial direction and inward in an axial direction, and said first and second bases are contiguous.

12. The clutch disk assembly according to claim 11, wherein said coil spring is arranged to have one more winding on a side closer to a,center of said clutch, assembly than on a side farther from said center of said clutch disk assembly.

13. The clutch disk assembly according to claim 12, wherein an elastic rod is disposed within said coil spring.

14. The clutch disk assembly according to claim 13, wherein each of said spring seats has a tip surface arranged to decline in a radial direction from said center of said clutch disk assembly relative to said axis of said elastic member.

15. The damper mechanism according to claim 5, wherein said coil spring is arranged to be non-rotatable about its own axis with respect to said spring seat.

16. The clutch disk assembly according to claim 15, wherein said seat part has an end winding abutment part that extends substantially parallel to said axis of said elastic member, said end winding abutment part is configured to abut a tip end of an end winding of said coil spring.

17. The clutch disk assembly according to claim 16, wherein each of said spring seats further comprises a through hole formed therein to extend in a direction that is substantially parallel to said axis of said elastic member.

18. The clutch disk assembly according to claim 17, wherein said coil spring is arranged to have one more winding on a side closer to a center of said clutch assembly than on a side farther from said center of said clutch disk assembly.

19. The clutch disk assembly according to claim 18, wherein an elastic rod is disposed within said coil spring.

20. The clutch disk assembly according to claim 19, wherein each of said spring seats has a tip surface arranged to decline in a radial direction from said center of said clutch disk assembly relative to said axis of said elastic member.

21. The clutch disk assembly according to claim 5, wherein a diameter of said seat part is smaller than a diameter of said elastic member.

* * * * *

UNITED STATES PATENT AND TRADEMARK OFFICE
CERTIFICATE OF CORRECTION

PATENT NO. : 6,645,079 B2
DATED : November 11, 2003
INVENTOR(S) : Yoshinari Yoshimura It is certified that error appears in the above-identified patent and that said Letters Patent is hereby corrected as shown below:

<u>Title page,</u>
Insert Item -- [30] Foreign Application Priority Data
        Jun. 13, 2001 (JP)……………………...2001-178500 --

Signed and Sealed this

Fourth Day of May, 2004

JON W. DUDAS
*Acting Director of the United States Patent and Trademark Office*